(12) United States Patent
Lay et al.

(10) Patent No.: US 8,837,771 B2
(45) Date of Patent: Sep. 16, 2014

(54) METHOD AND SYSTEM FOR JOINT MULTI-ORGAN SEGMENTATION IN MEDICAL IMAGE DATA USING LOCAL AND GLOBAL CONTEXT

(71) Applicants: Nathan Lay, Tallahassee, FL (US); Neil Birkbeck, Plainsboro, NJ (US); Jingdan Zhang, Plainsboro, NJ (US); Jens Guehring, Erlangen (DE); Shaohua Kevin Zhou, Plainsboro, NJ (US)

(72) Inventors: Nathan Lay, Tallahassee, FL (US); Neil Birkbeck, Plainsboro, NJ (US); Jingdan Zhang, Plainsboro, NJ (US); Jens Guehring, Erlangen (DE); Shaohua Kevin Zhou, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 13/777,024

(22) Filed: Feb. 26, 2013

(65) Prior Publication Data
US 2013/0223704 A1 Aug. 29, 2013

Related U.S. Application Data

(60) Provisional application No. 61/604,200, filed on Feb. 28, 2012.

(51) Int. Cl.
*G06K 9/00* (2006.01)
*G06K 9/34* (2006.01)
*G06T 7/00* (2006.01)
*A61B 6/00* (2006.01)

(52) U.S. Cl.
CPC ......... *G06K 9/34* (2013.01); *G06T 2207/20164* (2013.01); *G06T 2207/20076* (2013.01); *G06T 2207/10088* (2013.01); *G06T 2207/20124* (2013.01); *G06T 7/0081* (2013.01); *G06T 2207/20081* (2013.01); *G06T 2207/30056* (2013.01); *G06T 2207/30084* (2013.01)
USPC ............................... 382/100; 382/224; 378/4

(58) Field of Classification Search
CPC .......................................................... G06K 9/00
USPC ......... 382/100, 103, 106–107, 128–134, 162, 382/173, 181, 196, 199, 224, 232, 254, 274, 382/276, 286, 291, 294, 305, 312; 378/4, 6, 378/21; 707/749
See application file for complete search history.

(56) References Cited

U.S. PATENT DOCUMENTS

| | | | |
|---|---|---|---|
| 6,724,925 B2 * | 4/2004 | Armato et al. | 382/132 |
| 7,702,596 B2 | 4/2010 | Tu et al. | |
| 7,756,316 B2 * | 7/2010 | Odry et al. | 382/131 |
| 7,949,173 B2 | 5/2011 | Zhou et al. | |
| 8,116,548 B2 | 2/2012 | Zheng et al. | |
| 2007/0071313 A1 | 3/2007 | Zhou et al. | |
| 2007/0081712 A1 * | 4/2007 | Huang et al. | 382/128 |
| 2008/0101676 A1 * | 5/2008 | Zheng et al. | 382/131 |
| 2010/0080434 A1 | 4/2010 | Seifert et al. | |
| 2010/0254582 A1 | 10/2010 | Liu et al. | |
| 2011/0243386 A1 | 10/2011 | Sofka et al. | |

(Continued)

*Primary Examiner* — Seyed Azarian

(57) ABSTRACT

A method and system for segmenting multiple organs in medical image data is disclosed. A plurality of landmarks of a plurality of organs are detected in a medical image using an integrated local and global context detector. A global posterior integrates evidence of a plurality of image patches to generate location predictions for the landmarks. For each landmark, a trained discriminative classifier for that landmark evaluates the location predictions for that landmark based on local context. A segmentation of each of the plurality of organs is then generated based on the detected landmarks.

26 Claims, 4 Drawing Sheets

(56) References Cited

U.S. PATENT DOCUMENTS

| | | |
|---|---|---|
| 2012/0069003 A1 | 3/2012 | Birkbeck et al. |
| 2012/0070053 A1 | 3/2012 | Liu et al. |
| 2012/0173549 A1* | 7/2012 | Bouguet et al. ............... 707/749 |
| 2012/0230572 A1 | 9/2012 | Kohlberger et al. |
| 2012/0239174 A1 | 9/2012 | Shotton et al. |
| 2012/0269407 A1 | 10/2012 | Criminisi et al. |

* cited by examiner (a)              (b)              (c)

METHOD AND SYSTEM FOR JOINT MULTI-ORGAN SEGMENTATION IN MEDICAL IMAGE DATA USING LOCAL AND GLOBAL CONTEXT

This application claims the benefit of U.S. Provisional Application No. 61/604,200, filed Feb. 28, 2012, the disclosure of which is herein incorporated by reference.

BACKGROUND OF THE INVENTION

The present invention relates to segmenting multiple organs in medical images more particularly, to joint segmentation of multiple organs by fusing local and global context.

Algorithms for segmenting anatomical structures in medical images are typically targeted to segmenting individual structures. When the problem is posed as the joint segmentation of multiple organs, constraints, such as a non-overlapping constraint, may be formulated between the organs, and the combined formulation allows for a richer prior model on the joint shape of the multiple structures of interest. Such multi-organ segmentation is typically posed with atlas-based or level set-based formulations due to the ease in which geometric constraints can be modeled using such formulations.

However, level set methods are computationally demanding and typically require an accurate initialization so as not to fall into a local minimum. Discriminative learning-based methods are an alternative approach to such level set segmentations, but learning-based methods typically treat the initialization of each organ as an independent problem. While solving a single organ segmentation problem with learning-based methods can be fast, in order to achieve multi-object segmentation, a tree-like search structure has to be imposed on the detection order of the structures, resulting in a decrease in efficiency.

BRIEF SUMMARY OF THE INVENTION

The present invention provides a method and system for segmenting multiple organs in medical images using a combination of local and global context. Embodiments of the present invention integrate local and global discriminative information for efficient multiple organ segmentation. Embodiments of the present invention utilize an efficient detection algorithm in which global context is used to hypothesize likely locations for organ landmarks, and such locations are then evaluated with the local discriminative classifier. A non-parametric representation of global image context models correlations in the target shape for the multiple organs, allowing landmarks of multiple organs to be jointly localized. Further, embodiments of the present invention impose a statistical shape constraint on allowable reconstructed shapes, helping to filter out poorly detected landmarks.

In one embodiment of the present invention, a plurality of landmarks of a plurality of organs is detected in a medical image using an integrated local and global context detector. A segmentation of each of the plurality of organs is generated based on the detected plurality of landmarks.

These and other advantages of the invention will be apparent to those of ordinary skill in the art by reference to the following detailed description and the accompanying drawings.

DETAILED DESCRIPTION

The present invention relates to a method and system for segmenting multiple organs in medical images using a combination of local and global context. Embodiments of the present invention are described herein to give a visual understanding of the multi-organ segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention jointly segment multiple organs in medical image data, such as magnetic resonance (MR), computed tomography (CT), ultrasound, X-ray, etc. Embodiments of the present invention provide a method that fuses local and global image context through a product rule for simultaneous multi-organ segmentation. A global posterior integrates evidence over all volume patches, while the local image context is modeled with a discriminative classifier. Through non-parametric modeling of the global posterior, sparsity in the global context can be exploited to efficiently detect landmarks on target organs simultaneously. The complete surfaces of the target organs are inferred by aligning a shape model to the resulting landmarks. Embodiments of the present invention provide fast and accurate detection and segmentation of multiple organs even in challenging image data, such as low resolution MR Fast View images. Accordingly, embodiments of the present invention are capable of achieving near real-time segmentation of multiple organs, and are thus directly applicable to intelligent scanning. For example, the multi-organ segmentation method described herein can be run directly on an image acquisition device, such as an MR scanner, and be used to localize and refine the scan for a desired target organ.

Figure 1:
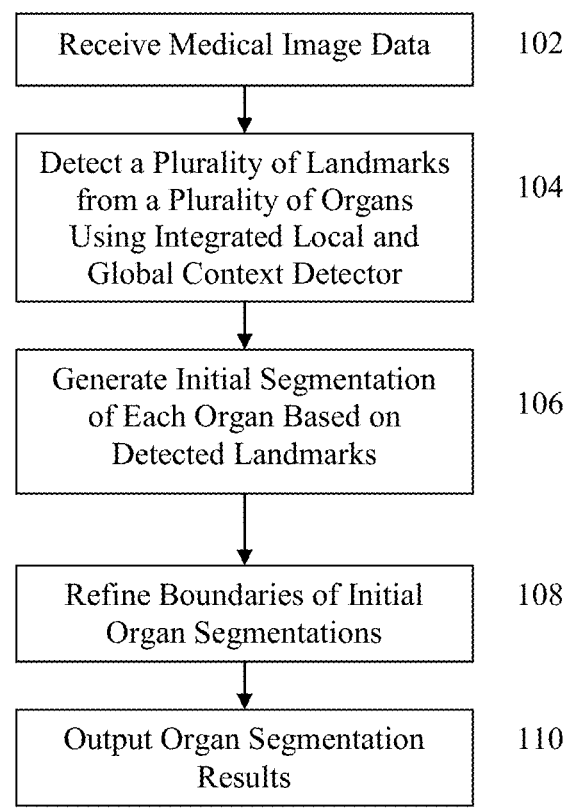
FIG. 1 illustrates a multi-organ segmentation method according to an embodiment of the present invention.

FIG. 1 illustrates a multi-organ segmentation method according to an embodiment of the present invention. The method of FIG. 1 transforms medical image data represent a patient's anatomy to detect and segment multiple organs in the medical image data. At step 102, medical image data of a patient is received. The medical image data can be a 3D volumetric medical image. In a possible embodiment, the medical image data is a 3D MR volume, but the present invention is not limited thereto, and the medical image data can be acquired using any imaging modality, such as MR, CT, DynaCT, Ultrasound, etc. The medical image data can be received directly from an image acquisition device, such as an MR or CT scanner. It is also possible that the medical image data be received by loading previously stored medical image data.

At step 104, a plurality of landmarks from a plurality of organs are detected in the medical image data using an integrated local and global context detector. In order to jointly segment C shapes, $S=[s_1, \ldots, s_C]$, given a volumetric image I, it can be assumed that there exists a set of D corresponding landmarks, $X=[x_1, \ldots, x_D]$, on the multiple shapes S. It can be noted that the term "landmarks" and "keypoints" are used herein interchangeably. The segmentation problem can then be decomposed into estimating the landmarks x given the image I using an integrated local and global context detector $P(X|I)$ (step 104) and estimating the shape of each organ given the landmarks using energy minimization (step 106).

To jointly detect the set of landmarks X, both local and global context are integrated using a product rule:

$$P(X|I) = P_L(X|I) P_G(X|I), \qquad (1)$$

where $P_L(X|I)$ and $P_G(X|I)$ are the local and global context posteriors, respectively.

Though not necessarily true, it can be assumed that the landmarks are locally independent:

$$P_L(X|I) = \Pi_{i=1}^{D} P_L(x_i|I). \qquad (2)$$

For modeling the local context posterior $P_L(x|I)$ for each landmark x, a discriminative detector is trained for the landmark x, that is:

$$P_L(x|I) = P_L(1|I[x])\omega_L(x), \qquad (3)$$

where I[x] is the local image patch centered at x and $\omega_L(x)$ is the discriminative detector trained based on annotated training data for the landmark x. In an exemplary implementation, the discriminative detector for each landmark can be trained based on annotated training data using a probabilistic boosting tree (PBT) and Haar-like features extracted from training data.

The set of all voxel points in the image I can be denoted as $\Omega$ and the size of $\Omega$ is denoted as $|\Omega|$. The global context posterior $P_G(X|I)$ integrates global evidence from all of the voxels $\Omega$ in the image I, i.e., $$P_G(X|I) = \Sigma_{y \in \Omega} P_G(X|I,y) P(y|I) = |\Omega|^{-1} \Sigma_{y \in \Omega} P_G(X|I[y]). \qquad (4)$$

In Equation (4), a uniform prior probability $P(y|I) = |\Omega|^{-1}$ is assumed.

An annotated training dataset and a nearest neighbor (NN) approach is used to learn (train) $P_G(X|I[y])$, the probability for each of the landmarks x when observing the image patch I[y] at a location y. Based on a dataset of training images with annotated landmarks, a database $\{J_n, dX_n\}_{n=1}^{N}$ including N pairs of an image patch J and a corresponding relative shift dX is iteratively constructed. At the $n^{th}$ iteration, a training image is randomly sampled, say training image $\tilde{J}$ with annotated landmark points $\tilde{X}$, and a voxel location z in the training image is randomly sampled, the image patch $J_n$ is set as $J_n = \tilde{J}[z]$ and the corresponding relative shift $dX_n$ is determined as $dX_n = \tilde{X} z \boxminus 1_D$, where $z \square 1_D = [z, \ldots, z]$ that concatenates z in D times. Accordingly, for each image patch $J_n$, the corresponding relative shift $dX_n$ is a vector, each element of which is a relative shift between a respective one of the vector of landmarks X and the voxel location at which the image patch $J_n$ is centered. The database $\{J_n, dX_n\}_{n=1}^{N}$ is learned offline and for a test image patch I[y] of an input image I, the K nearest neighbors $\{\hat{J}_1, \ldots, \hat{J}_K\}$ in the learned database $\{J_n, dX_n\}_{n=1}^{N}$ are determined along with their corresponding shift vectors $\{d\hat{X}_{G,1}[y], \ldots, d\hat{X}_{G,K}[y]\}$, and $P_G(X|I[y])$ is calculated as:

$$P_G(X|I[y]) = K^{-1} \Sigma_{k=1}^{K} \delta(Xy \square 1_D - d\hat{X}_{G,k}[y]). \qquad (5)$$

The nearest neighbors can be found as the points with the smallest Euclidean distance (e.g., distance between two image patches). Finding exact nearest neighbors can be challenging or slow in high dimensional spaces, so in an exemplary implementation approximate nearest neighbors are estimated. These neighbors are estimated found by constructing binary space partitioning trees, which is a binary tree that splits on a hyperplane. In an exemplary implementation, the hyperplanes are limited to be haar features. Accordingly, at each image patch I[y] in an image I, $P_G(X|I[y])$ predicts a location for each of the D landmarks in the landmark vector x. Thus, a single scan of images patches in an image simultaneously provides predicted locations for all of the landmarks based on the global context.

Using the local independence assumption and vector decomposition, the expected landmark location $\bar{x}$ for a given landmark can be expressed as:

$$\bar{x} = K^{-1}|\Omega|^{-1} \Sigma_{y \in \Omega} \Sigma_{k=1}^{K} (y + d\hat{x}_{G,k}[y]) \omega_L(y + d\hat{x}_{G,k}[y]). \qquad (6)$$

According to an advantageous embodiment of the present invention, Equation (6) implies an efficient scheme in which the local detector trained for a given landmark is only evaluated for the locations of that landmark predicted from the global context posterior, instead of scanning the whole image with each local detector. This results in a significant reduction in computation.

The global context from all of the voxels in an image is highly redundant, as neighboring patches tend to similarly predict nearby landmark locations. Therefore, in an advantageous embodiment of the present invention, the global context can be "sparsified" by generating a subset of voxels $\Omega_l$ from the full set of voxels $\Omega$ in the image, and evaluating only image patches centered at the subset of voxels $\Omega_l$ with the global context posterior. For example, the subset of voxels $\Omega_l$ can be generated by skipping l voxels in the image between each voxel included in the subset $\Omega_l$. This results in a further significant reduction in computations complexity by $O(l^3)$.

Figure 2:
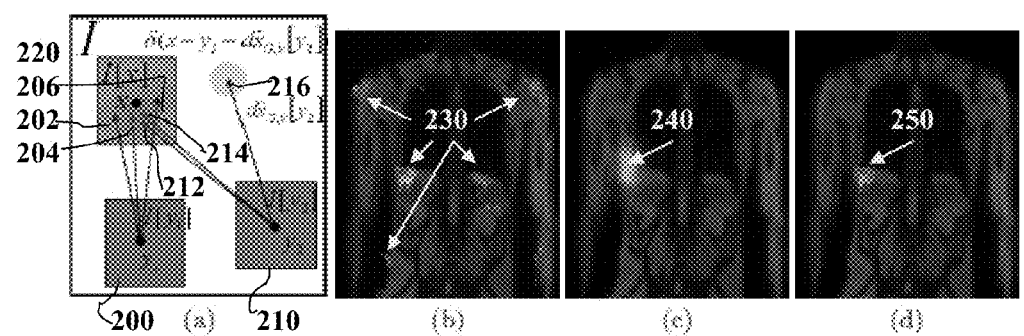
FIG. 2 illustrates exemplary landmark detection using integrated local and global context.

FIG. 2 illustrates exemplary landmark detection using integrated local and global context. Image (a) of FIG. 2 the nearest neighbor approach for predicting landmark locations based on the global context. As shown in image (a), predictions for a location of a landmark x are generated based on image patches $I[y_1]$ 200 and $I[y_2]$ 210 by the global context posterior using Equation (5) with K=3 (i.e., three nearest neighbors). The global context posterior predicted three locations 202, 204, and 206 for the landmark based on image patch $I[y_1]$ 200 and predicted three locations 212, 214, and 216 for the landmark based on the on image patch $I[y_2]$ 210. The predicted locations 202, 204, and 206 from the first image patch $I[y_1]$ 200 are generated by applying the relative shifts of corresponding to the three nearest neighbors of $I[y_1]$ in the learned database at $y_1$. The predicted locations 212, 214, and 216 from the second image patch $I[y_2]$ 210 are generated by applying the relative shifts of corresponding to the three nearest neighbors of $I[y_2]$ in the learned database at $y_2$. As can be seen in image (a), each predicted location 202, 204, 206, 212, 214, and 216 can be a predicted region surrounding the predicted location. It can be observed that many of these regions will overlap. The combination of all of these regions provide the set of voxels to be evaluated based on their local context. The final estimate for the location of the landmark x is detected by evaluating the predicted locations 202, 204, 206, 212, 214, and 216 with the trained local discriminative detector based on the local context. In particular, the final estimate for the position of the landmark x is a weighted combination of the position of the predicted locations, 202, 204, 206, 212, 214, 216, weighted by the local context score given at that location. For example, the local context I[x] 220 centered at the detected location for the landmark x is shown.

Image (b) of FIG. 2 shows detection scores for a landmark on the top left of the liver in a low resolution MR FastView 3D volume using only local context to evaluate the entire image. As shown in image (b), scanning the image with a trained landmark detector that evaluates local context results in responses 230 in various regions of the image, including many spurious responses. Image (c) of FIG. 2 shows landmark location predictions 240 for the landmark on the top left of the liver determined by evaluating the image based on the global context. It can be seen in image (c) that the global context provides a coarse localization of the landmark in the image. Image (d) of FIG. 2 shows the integration of local and global detection. As shown in image (d), responses 250 of the trained local discriminative classifier evaluated only at the landmark location predictions 240 provided by the global context provide increased accuracy and a fine scale density.

Returning to FIG. 1, at step 106, an initial segmentation of each organ is generated based on the detected landmarks. In an advantageous implementation, an initial segmentation for each organ is aligned to the sparse detected landmarks through the use of a statistical shape model of shape variation. A point distribution model is learned from a training dataset using principal component analysis (PCA) for each organ shape, in which each organ shape is represented as a mean shape, $\overline{V}=[\overline{v}_1, \overline{v}_2, \ldots, \overline{v}_m]$, plus a linear combination of eigenmodes, $U_i=(u_{1,i}, u_{2,i}, \ldots, u_{m,i})$, with $1 \le i \le N_{pca}$, where m is a number vertices on the organ shape and $N_{pca}$ denotes the order of the PCA.

As the complete organ shape is characterized by only a few coefficients that modulate the eigenmodes, the point distribution model can be used to infer a shape from a sparse set of landmark points. Given the set of detected landmarks on the organ $x_j$, the best fitting instance of the complete shape is determined by minimizing the following energy function:

$$\beta, \{\lambda_i\} = \arg\min_{\beta, \{\lambda_i\}} \sum_{j=1}^{D} \psi\left(\left\|x_j - T\left(\left(\overline{v}_{\gamma(j)} + \sum_{i=1}^{m} \lambda_i u_{\gamma(j),i}\right), \beta\right)\right\|^2\right) + \sum_{i=1}^{N_{pca}} \lambda_i^2 / \eta_i \quad (7)$$

where the function T is a 9D similarity transformation parameterized by the vector $\beta=(t_x,t_y,t_z,\theta_x,\theta_y,\theta_z,s_x,s_y,s_z)$, $\{\eta_i\}_{i=1}^{N_{pca}}$ are the corresponding eigenvalues, and $\gamma(j): \{1, \ldots, D\} \rightarrow \{1, \ldots, M\}$ maps the landmark index to the index of the vertex on the organ shape. The first term in equation (7) measures the differences between a predicted shape under a hypothesis transformation from the detected landmark and the second term is a prior keeping the eigenmodes responsible for smaller variation closer to zero. As only a few landmarks may be detected for each organ and the PCA model may have a larger number of vertices, using no prior term gives rise to an ill-posed problem. $\psi$ is a robust norm that reduces the effects of outliers. For example, $\psi(s^2)=s$ can be used. The shape coefficients $\lambda_i$ can be used to modulate the full basis vectors $U_i$, giving a complete estimate of the shape.

In the above formulation, at least four non-coplanar landmark points are required on each organ to solve for the pose and shape of each organ. Thus, a minimum of 4C landmarks must be detected for C organs, with more landmarks resulting in a more accurate estimate. In an alternate implementation, the number of landmarks can be reduced by using a joint shape model for multiple organs. For example, by concatenating the shape coordinates from multiple organs into a single vector and obtaining statistical shape model can be obtained from this joint shape, correlations between the shapes can be leveraged to initialize from fewer landmark points.

At step 108, the boundaries of the initial organ segmentations are refined. Using the initial segmentation for each organ, the points on the surface of the mesh for each organ are refined by iteratively displacing each vertex along its surface normal, $v_i \leftarrow v_i + n_i \hat{\tau}_i$. The best displacement for each point can be obtained by maximizing the output of a trained discriminative classifier:

$$\tau_i = \arg\max_{\tau_i} p(+1|v_i + n_i \tau_i). \quad (8)$$

Here, $p(+1|\cdot)$ denotes a probability that the point $v_i + n_i \hat{\tau}_i$ is on the boundary of the organ being segmented, as determined by a discriminative classifier trained based on annotated training data. In a possible implementation, this discriminative classifier may be trained using a probabilistic boosting tree (PBT). Once the displacements are calculated for each vertex on the organ boundary, regularity is then incorporated into the independently estimated displacements by projecting the resulting mesh onto the linear subspace spanned by a linear shape model.

At step 110, the organ segmentation results for the multiple organs are output. The organ segmentation results can be output by displaying the segmented organs, for example on a display device of a computer system. The organ segmentation results can also be stored, for example in a memory or storage of a computer system.

In order to test the above described method, the method was implemented by the present inventors in C++ and compiled using Visual Studio 2008, but the present invention is not limited thereto and any implementation of the above described algorithms can be used. In the experiments described below, timing results are reported for an Intel Xeon 64-bit machine running Windows Server 2008. The combined posterior model was tested on segmentation of the liver and kidneys in a challenging set of MR FastView localizer images that are acquired for MR examination planning. A total of 185 volumes having 5 mm isotropic spacing were split into a training set of 135 volumes and a test set of 50 volumes. This data is challenging due to the low resolution, weak boundaries, and varying image contrast across scans. For this example, the global context used a total of K=10 nearest neighbors. A total of 10 BSP-trees were generated to approximate the nearest neighbors. Each tree was limited to a maximum depth of 10, so a total of 10,000 hyperplanes were used to approximate the nearest neighbors. The hyperplanes used in the trees are constrained to be Haar features. The local detectors were also trained on 5 mm resolution using a PBT and a combination of Haar and image gradient features. As the shape variation within the kidneys is smaller than the liver, only eight keypoints (landmarks) were used per kidney and ten keypoints were used for the liver.

The experiments demonstrated the effectiveness of integrating local and global context with respect to accuracy and evaluation timing. Table 1, below, illustrates median errors for all shape keypoint positions averaged over the testing set of volumes.

TABLE 1

Accuracy and timing results for the shape key point detection using local, global, and local + global context posterior (measured in mm)

| | Global | | | Local | | | Local + Global | | |
|---|---|---|---|---|---|---|---|---|---|
| Spacing | Time | Median | Std | Time | Median | Std | Time | Median | Std |
| 1 | 0.86 | 26.1 | 18.8 | 2.42 s | 25.9 | 30.2 | 121.0 | 10.0 | 6.27 |
| 5 | 0.84 | 32.7 | 23.1 | — | — | — | 1.05 | 10.1 | 6.38 |
| 7 | 0.85 | 36.7 | 26.2 | — | — | — | 0.48 | 10.6 | 6.72 |
| 10 | 0.84 | 41.0 | 32.8 | — | — | — | 0.27 | 11.0 | 7.06 |
| 12 | 0.86 | 47.12 | 42.3 | — | — | — | 0.23 | 11.3 | 7.29 |
| 15 | 0.86 | 133.6 | 176.4 | — | — | — | 0.17 | 12.0 | 8.04 |

Regarding detection based on the global context, while it is possible to achieve faster evaluation times with a sparse sampling of the global context, the present inventors observed that a maximum a posteriori (MAP) estimate gave better results. Obtaining the MAP estimate requires populating a probability image and scanning through the image to get the MAP estimate. This is proportional to the number of landmarks, which is why no speed-up is reported in Table 1 for the timing results for key point detection using only the global context. Further, the accuracy of the global context posterior suffers from sparse sampling, and even when using dense sampling still performs worse that the local+global method. On the other hand, it is evident that the sparser sampling has little impact on the accuracy of the local+global method. The local classifier is computed using a constrained search over the volume (e.g., using bounds for the landmark positions relative to the image), but still achieves worse accuracy and is slower than the combined local+global posterior modeling.

Figure 3:
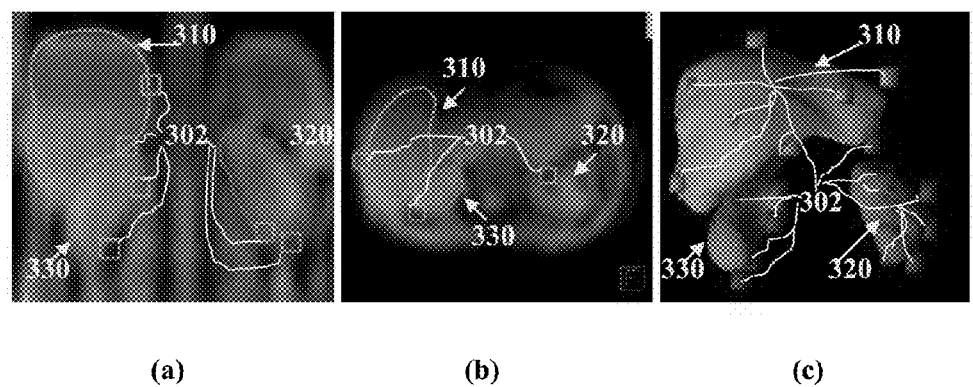
FIG. 3 illustrates exemplary landmark detection and organ segmentation results.

The detected keypoints are used to infer the joint shape of all of the organs. FIG. 3 illustrates exemplary landmark detection and organ segmentation results. Images (a) and (b) are orthogonal views of an MR volume showing detected landmarks 302 segmentation results for the liver 310, left kidney 320, and right kidney 330. Image (c) is a 3D rendering showing the detected landmarks 302 and the segmentation results for the liver 310, left kidney 320, and right kidney 330.

The segmentation results of the liver and kidneys from the test volumes are compared to a state of the art detection using marginal space learning (MSL). For the MSL setup, the kidneys were predicted from the liver bounding box, meaning the kidney search range was more localized allowing the detection to be faster. Table 2, below, illustrates the timing and accuracy results for the 50 unseen test cases using both MSL and the local+global context detection method according to an embodiment of the present invention.

TABLE 2

Accuracy and timing for segmentation results using our model compared to the state of the art MSL model.

| | | | Liver | | R. Kidney | | L. Kidney | |
|---|---|---|---|---|---|---|---|---|
| | Skip | Time(s) | Median | Q80 | Median | Q80 | Median | Q80 |
| Detection & Shape initialization | | | | | | | | |
| MSL | — | 1.91 s | 9.07 | 10.80 | 3.24 | 4.26 | 2.89 | 3.80 |
| Local + Global | 5 | 1.13 | 7.43 | 8.58 | 3.71 | 5.23 | 3.67 | 5.14 |
| | 7 | 0.51 | 7.51 | 8.92 | 4.00 | 5.29 | 3.90 | 5.91 |
| | 10 | 0.30 | 7.51 | 9.04 | 4.02 | 5.67 | 4.22 | 6.34 |
| | 12 | 0.24 | 7.69 | 9.24 | 4.11 | 6.32 | 4.40 | 6.46 |
| | 15 | 0.20 | 7.70 | 9.94 | 4.30 | 7.54 | 4.45 | 6.68 |
| With boundary refinement | | | | | | | | |
| MSL | — | 2.14 s | 4.77 | 6.00 | 2.12 | 2.48 | 2.03 | 2.34 |
| Local + Global | 5 | 1.38 | 3.92 | 5.26 | 2.20 | 2.90 | 2.10 | 2.53 |
| | 7 | 0.76 | 3.90 | 5.33 | 2.22 | 2.81 | 2.11 | 2.71 |
| | 10 | 0.55 | 3.90 | 5.24 | 2.29 | 3.03 | 2.15 | 2.91 |
| | 12 | 0.49 | 3.96 | 5.30 | 2.27 | 3.44 | 2.15 | 2.81 |
| | 15 | 0.44 | 4.14 | 5.46 | 2.33 | 3.51 | 2.18 | 3.25 |

The error is driven up by some cases having large errors. Part of this error is due to not having enough training examples for the variance in appearance of the organs. For this reason, Table 2 reports the median surface-to-surface error (in mm) and the 80% quantile (Q80). During detection and shape initialization, it can be seen that the fast keypoint initialization can provide an approximate shape in as little as 0.3 seconds (for skip=10). The local+global context approach shows an improvement in shape initialization on the liver over the MSL approach, which is likely due to the use of more keypoints on the liver as opposed to MSL. For the final boundary refinement, it can be seen that the results are comparable in accuracy, with our approach being more efficient, e.g., three times faster if every $7^{th}$ voxel is sampled in the global context.

Figure 4:
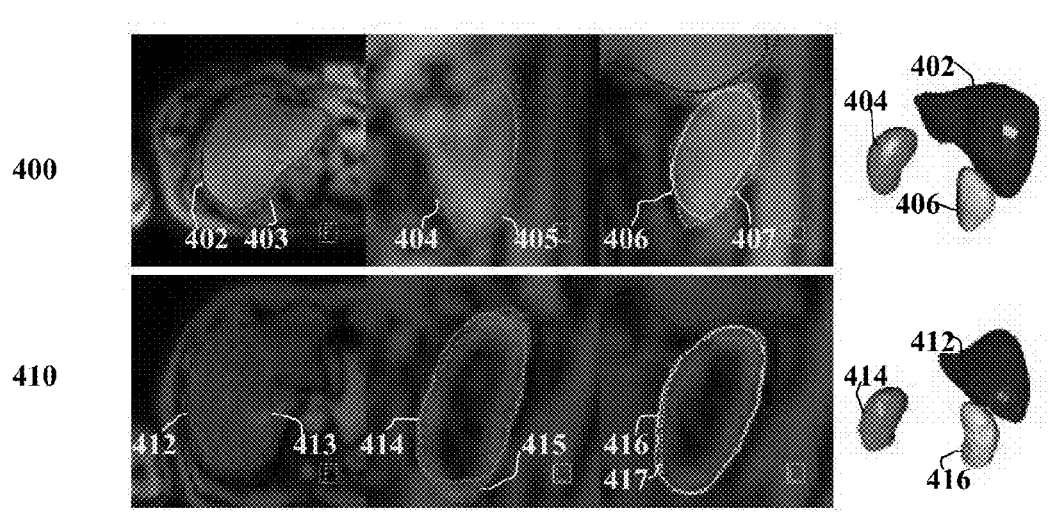
FIG. 4 illustrates exemplary qualitative results of segmenting the liver and kidneys.

FIG. 4 illustrates exemplary qualitative results of segmenting the liver and kidneys. As shown in FIG. 4, rows 400 and 410 show segmentation results for the liver and kidneys in first and second MR scans, respectively. Row 400 shows segmentation results for the liver 402, left kidney 404, and right kidney 406, as well as the ground truth for the liver 403, left kidney 405, and right kidney 407. Row 410 shows segmentation results for the liver 412, left kidney 414, and right kidney 416, as well as the ground truth for the liver 413, left kidney 415, and right kidney 417.

Figure 5:
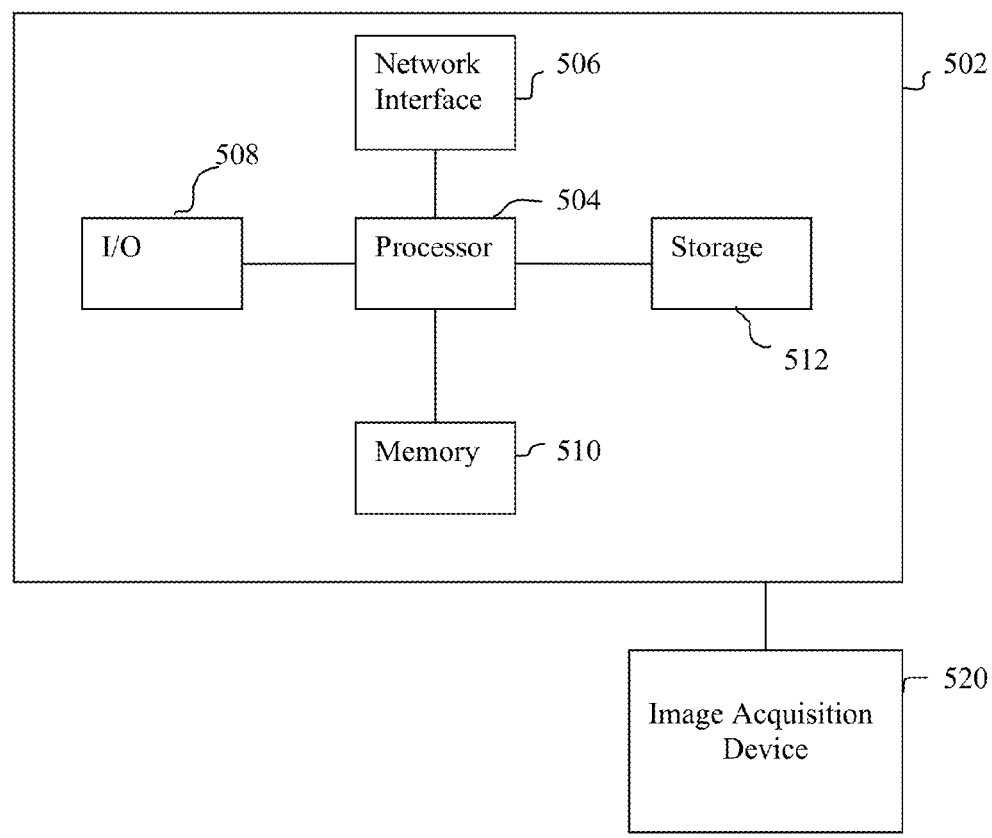
FIG. 5 is a high-level block diagram of a computer capable of implementing the present invention.

The above-described methods for segmenting multiple organs in a medical image may be implemented on a computer using well-known computer processors, memory units, storage devices, computer software, and other components. A high-level block diagram of such a computer is illustrated in FIG. 5. Computer 502 contains a processor 504, which controls the overall operation of the computer 502 by executing computer program instructions which define such operation. The computer program instructions may be stored in a storage device 512 (e.g., magnetic disk) and loaded into memory 510 when execution of the computer program instructions is desired. Thus, the steps of the methods of FIG. 1 may be defined by the computer program instructions stored in the memory 510 and/or storage 512 and controlled by the processor 504 executing the computer program instructions. An image acquisition device 520, such as a CT scanning device, MR scanning device, Ultrasound device, etc., can be connected to the computer 502 to input image data to the computer 502. It is possible to implement the image acquisition device 520 and the computer 502 as one device. It is also possible that the image acquisition device 520 and the computer 502 communicate wirelessly through a network. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). Such input/output devices 508 may be used in conjunction with a set of computer programs as an annotation tool to annotate volumes received from the image acquisition device 520. One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting a plurality of organs in a medical image, comprising:
   detecting a plurality of landmarks of the plurality of organs in the medical image using an integrated local and global context detector, wherein detecting a plurality of landmarks of the plurality of organs in the medical image using an integrated local and global context detector comprises:
      generating a respective set of location predictions for each of the plurality of landmarks from each of a plurality of image patches of the medical image using a global context posterior, and
      for each of the plurality of landmarks, detecting the landmark by evaluating the predicted locations for that landmark based on a local context using a trained discriminative classifier for that landmark; and
   generating a segmentation of each of the plurality of organs based on the detected plurality of landmarks.

2. The method of claim 1, wherein generating a respective set of location predictions for each of the plurality of landmarks from each of a plurality of image patches of the medical image using a global context posterior comprises, for each image patch:
   determining a number of nearest neighbor image patches in a database of image patches;
   determining location predictions for each of the plurality of landmarks based on a relative shift vector corresponding to each of the nearest neighbor image patches, wherein each relative shift vector includes relative shifts between a voxel in a training volume at which the corresponding nearest neighbor image patch is centered and each of the plurality of landmarks in the training volume.

3. The method of claim 2, wherein determining location predictions for each of the plurality of landmarks based on a relative shift vector corresponding to each of the nearest neighbor image patches comprises:
   generating a prediction for each of the plurality of landmarks from each relative shift vector by applying the relative shift associated with each respective landmark to a voxel in the medical image at which the image patch is centered.

4. The method of claim 1, wherein generating a respective set of location predictions for each of the plurality of landmarks from each of a plurality of image patches of the medical image using a global context posterior comprises:
   for each of the plurality of image patches, simultaneously generating the location predictions for each of the plurality of landmarks using the global context posterior.

5. The method of claim 1, wherein generating a respective set of location predictions for each of the plurality of landmarks from each of a plurality of image patches of the medical image using a global context posterior comprises:
   generating a subset of voxels sampled from a total number of voxels in the medical image; and
   generating the location predictions for each of the plurality of landmarks from a respective image patch centered at each of the subset of voxels using the global context posterior.

6. The method of claim 1, wherein generating a segmentation of each of the plurality of organs based on the detected plurality of landmarks comprises:
   aligning a respective trained statistical shape model for each organ to the medical image based on a respective subset of the plurality of landmarks for each organ.

7. The method of claim 1, wherein generating a segmentation of each of the plurality of organs based on the detected plurality of landmarks comprises:
   aligning a trained statistical shape model of a joint shape of the plurality of organs to the medical image based on the plurality of landmarks.

8. The method of claim 1, further comprising:
   refining a boundary of the segmentation for each of the plurality of organs using a trained boundary detector for each organ.

9. The method of claim 8, wherein refining a boundary of the segmentation for each of the plurality of organs using a trained boundary detector for each organ comprises, for each organ:
   iteratively displacing each vertex on a surface of a mesh segmented for the organ along a surface normal to maximize a response of the trained boundary detector, resulting in an adjusted mesh; and projecting the adjusted mesh onto a linear subspace spanned by a linear shape model of the organ.

10. An apparatus for segmenting a plurality of organs in a medical image, comprising:
means for detecting a plurality of landmarks of the plurality of organs in the medical image using an integrated local and global context detector,
wherein the means for detecting a plurality of landmarks of the plurality of organs in the medical image using an integrated local and global context detector comprises:
means for generating a respective set of location predictions for each of the plurality of landmarks from each of a plurality of image patches of the medical image using a global context posterior, and
means for detecting each of the plurality of landmarks by evaluating the predicted locations for that landmark based on a local context using a trained discriminative classifier for that landmark; and
means for generating a segmentation of each of the plurality of organs based on the detected plurality of landmarks.

11. The apparatus of claim 10, wherein the means for generating a respective set of location predictions for each of the plurality of landmarks from each of a plurality of image patches of the medical image using a global context posterior comprises:
means for determining, for each image patch, a number of nearest neighbor image patches in a database of image patches;
means for determining location predictions for each of the plurality of landmarks based on a relative shift vector corresponding to each of the nearest neighbor image patches, wherein each relative shift vector includes relative shifts between a voxel in a training volume at which the corresponding nearest neighbor image patch is centered and each of the plurality of landmarks in the training volume.

12. The apparatus of claim 11, wherein the means for determining location predictions for each of the plurality of landmarks based on a relative shift vector corresponding to each of the nearest neighbor image patches comprises:
means for generating a prediction for each of the plurality of landmarks from each relative shift vector by applying the relative shift associated with each respective landmark to a voxel in the medical image at which the image patch is centered.

13. The apparatus of claim 10, wherein the means for generating a respective set of location predictions for each of the plurality of landmarks from each of a plurality of image patches of the medical image using a global context posterior comprises:
means for simultaneously generating the location predictions for each of the plurality of landmarks from an image patch using the global context posterior.

14. The apparatus of claim 10, wherein the means for generating a respective set of location predictions for each of the plurality of landmarks from each of a plurality of image patches of the medical image using a global context posterior comprises:
means for generating a subset of voxels sampled from a total number of voxels in the medical image; and
means for generating the location predictions for each of the plurality of landmarks from a respective image patch centered at each of the subset of voxels using the global context posterior.

15. The apparatus of claim 10, wherein the means for generating a segmentation of each of the plurality of organs based on the detected plurality of landmarks comprises:
means for aligning a respective trained statistical shape model for each organ to the medical image based on a respective subset of the plurality of landmarks for each organ.

16. The apparatus of claim 10, wherein the means for generating a segmentation of each of the plurality of organs based on the detected plurality of landmarks comprises:
means for aligning a trained statistical shape model of a joint shape of the plurality of organs to the medical image based on the plurality of landmarks.

17. The apparatus of claim 10, further comprising:
means for refining a boundary of the segmentation for each of the plurality of organs using a trained boundary detector for each organ.

18. A non-transitory computer readable medium storing computer program instructions for segmenting a plurality of organs in a medical image, the computer program instructions when executed on a processor cause the processor to perform operations comprising:
detecting a plurality of landmarks of the plurality of organs in the medical image using an integrated local and global context detector, wherein detecting a plurality of landmarks of the plurality of organs in the medical image using an integrated local and global context detector comprises:
generating a respective set of location predictions for each of the plurality of landmarks from each of a plurality of image patches of the medical image using a global context posterior, and
for each of the plurality of landmarks, detecting the landmark by evaluating the predicted locations for that landmark based on a local context using a trained discriminative classifier for that landmark; and
generating a segmentation of each of the plurality of organs based on the detected plurality of landmarks.

19. The non-transitory computer readable medium of claim 18, wherein generating a respective set of location predictions for each of the plurality of landmarks from each of a plurality of image patches of the medical image using a global context posterior comprises, for each image patch:
determining a number of nearest neighbor image patches in a database of image patches;
determining location predictions for each of the plurality of landmarks based on a relative shift vector corresponding to each of the nearest neighbor image patches, wherein each relative shift vector includes relative shifts between a voxel in a training volume at which the corresponding nearest neighbor image patch is centered and each of the plurality of landmarks in the training volume.

20. The non-transitory computer readable medium of claim 19, wherein determining location predictions for each of the plurality of landmarks based on a relative shift vector corresponding to each of the nearest neighbor image patches comprises:
generating a prediction for each of the plurality of landmarks from each relative shift vector by applying the relative shift associated with each respective landmark to a voxel in the medical image at which the image patch is centered.

21. The non-transitory computer readable medium of claim 18, wherein generating a respective set of location predictions for each of the plurality of landmarks from each of a plurality of image patches of the medical image using a global context posterior comprises:

for each of the plurality of image patches, simultaneously generating the location predictions for each of the plurality of landmarks using the global context posterior.

22. The non-transitory computer readable medium of claim 18, wherein generating a respective set of location predictions for each of the plurality of landmarks from each of a plurality of image patches of the medical image using a global context posterior comprises:

generating a subset of voxels sampled from a total number of voxels in the medical image; and generating the location predictions for each of the plurality of landmarks from a respective image patch centered at each of the subset of voxels using the global context posterior.

23. The non-transitory computer readable medium of claim 18, wherein generating a segmentation of each of the plurality of organs based on the detected plurality of landmarks comprises:

aligning a respective trained statistical shape model for each organ to the medical image based on a respective subset of the plurality of landmarks for each organ.

24. The non-transitory computer readable medium of claim 18, wherein generating a segmentation of each of the plurality of organs based on the detected plurality of landmarks comprises:

aligning a trained statistical shape model of a joint shape of the plurality of organs to the medical image based on the plurality of landmarks.

25. The non-transitory computer readable medium of claim 18, the operations further comprising:

refining a boundary of the segmentation for each of the plurality of organs using a trained boundary detector for each organ.

26. The non-transitory computer readable medium of claim 25, wherein refining a boundary of the segmentation for each of the plurality of organs using a trained boundary detector for each organ comprises, for each organ:

iteratively displacing each vertex on a surface of a mesh segmented for the organ along a surface normal to maximize a response of the trained boundary detector, resulting in an adjusted mesh; and projecting the adjusted mesh onto a linear subspace spanned by a linear shape model of the organ.

* * * * *